Patented Sept. 27, 1949

2,482,958

UNITED STATES PATENT OFFICE 2,482,958

CHEMICAL MANUFACTURE

Eric R. Woodward, New York, N. Y., assignor to Mathieson Chemical Corporation, a corporation of Virginia No Drawing. Application August 23, 1946, Serial No. 692,708

3 Claims. (Cl. 99—150)

The present invention relates to the sterilizing or reduction of micro-organism count of natural spices, that is, materials characterized by a high content of essential oils, and which are generally used in the preparation of meats and other foods, for instance pepper, nutmeg, mace, allspice, cinnamon, clove, ginger, coriander, sage, paprika, and the like. The invention is applicable to the treatment of such spices as the dried whole berry, seed, leaf or the like, or in a finely divided form, either in dry or moist condition. The invention is of particular utility in the treatment of spices to be used in the canning of foods.

Natural spices are normally infested with micro-organisms or the spores of micro-organisms, particularly moulds, yeast and bacteria. In the dried form the infestations are usually in a dormant state, as spores, but in a moist environment or where the spice is incorporated in foods the spores may become active and cause deterioration of the spice or of the food in which it is incorporated. The presence of relatively small numbers of micro-organisms is not necessarily harmful, but where infestation is relatively large spoilage is apt to result.

Black pepper, for instance, is widely used in the curing of uncooked meat, and where a spore-infested pepper is used for this purpose, the infestation of large portions of the meat may result under conditions favorable to the activation and growth of the micro-organisms. This is likewise true where the spice is used in the canning of food.

The sterilizing of spices by prolonged heating at high temperatures is not wholly effective and has been found unsatisfactory because of the reduction in the characteristic essential oil content of the spice under such conditions and also because of a deterioration in their natural color characteristics. Many micro-organisms found to infest such spices are not destroyed by temperatures normally employed in the canning of foods.

The present invention provides an improved method whereby the micro-organisms normally present in spices may be completely destroyed or reduced to safe limits without the use of destructively high temperatures and whereby the loss of the essential oil content of the spice is avoided or materially reduced.

I have discovered that the bacterial count of natural spices in either a substantially dry or moist state may be materially reduced by treatment of the spice with chlorine dioxide diluted with a inert gas, air for instance, without materially altering the characteristic color, flavor or strength of the natural spice.

It has previously been proposed to bleach, age, sterilize and change the aking qualities of flour and similar cereal products consisting primarily of starchy material, by treatment with chlorine dioxide. It has also been proposed to spray plant-like structures with an aqueous solution of chlorine dioxide or to immerse such plant-like structures in a chlorine dioxide solution for the purpose of killing parasites and the like. However, it has not heretofore been known that material, such as natural spices, having a high content of essential oils could be effectively sterilized by treatment with chlorine dioxide without deleteriously affecting the characteristic desirable properties of the spice.

I have further discovered that such spices may be especially effectively sterilized without deleteriously affecting the desirable characteristics of the spices where the chlorine dioxide treatment is employed in conjunction with a moderate heat treatment, more particularly by first treating the spice with chlorine dioxide, as just noted, and thereafter subjecting it to a moderately elevated temperature.

The results attained by my two-step process greatly exceed the summation of results attained where the chlorine dioxide treatment and such heat treatment are used respectively without the other.

In accordance with my present invention, the spice in either a substantially dry or a moist state is subjected to the action of a dilute gaseous mixture of chlorine dioxide and an inert gas, air for instance. As previously noted, the spice may be treated in a finely divided form or in the usual whole spice form. In carrying out the process where the spice is in powdered form the spice is with advantage subjected to the chlorine dioxide atmosphere in relatively thin layers so as to insure complete, rapid and relatively uniform penetration of the chlorine dioxide through the mass. As an alternative, the spice may be vigorously agitated in a closed vessel to which the chlorine dioxide mixture is supplied in such a way as to effect a suspension of the spice in the gas mixture.

Where the spice is in larger pieces, the mass is penetrated more rapidly by the gas, and masses of greater thickness may be rapidly and uniformly treated.

The time of exposure and the concentration of the chlorine dioxide in the gaseous mixture are to a major extent interdependent. Chlorine dioxide in concentrated form is of course hazardous to handle and is usually handled in admixture with an inert gas, air for instance, in such proportions that the partial pressure of the chlorine dioxide does not exceed about 30 mm. of mercury.

For the purpose of my present invention, I use a mixture of the chlorine dioxide and an inert gas, air for instance, in proportions such that the partial pressure of the chlorine dioxide is substantially below the safe handling range. The chlorine dioxide may be generated by any convenient method, for instance by the reaction with a chlorite of chlorine gas diluted with air. The concentration of my chlorine dioxide-air mixture may be controlled by regulating the proportions of chlorine and air in the mixture passed in contact with the chlorite.

Where it is desirable to use a shortened treating period, the concentration of the chlorine dioxide may be increased somewhat, care being taken to maintain the partial pressure of the chlorine dioxide at all times below 30 mm. of mercury. The action of the chlorine dioxide on the spice is surprisingly selective, and accordingly the concentration and range of proportions of chlorine dioxide used, and the period of treatment, or contact time, may be varied over a considerable range. For instance a contact time of the order of 30 minutes, using chlorine dioxide at partial pressures of about 1 to 20 mm. of mercury, will be found particularly desirable under various conditions and to result in a complete sterilization or a substantial reduction in bacterial count without materially injuring the spice. As previously noted, the action is more rapid at higher concentrations. Also, optimum treating conditions will vary somewhat with the particular spice, the extent of infestation of the spice originally, and that permissible in the treated spice.

The temperature at which the operation is carried out is likewise subject to considerable variation. Satisfactory results may be obtained at ordinary room temperature but a somewhat higher temperature, say about 50–60° C., is frequently desirable.

As previously noted, in accordance with a particularly desirable modification of my invention, the spice, following a pre-treatment with the chlorine dioxide, is subjected to a moderate heat treatment. Such heat treatment is with advantage of the order of that conventionally used in commercial canning operations, say heating for about 10 minutes at the temperature of saturated steam under a pressure of about 5 pounds, that is, about 225° F. The temperature and duration of this heat treating step may likewise be varied somewhat, care being taken not to exceed that at which the particular spice is deleteriously affected. A temperature of the order of that just noted is sufficient for the purpose of my present invention and is usually preferred. However, temperatures as low as about 100° F. may be used with advantage.

Where the spice is to be used promptly in a canning operation, the heating incidental to the canning operation is usually sufficient adequately to reduce the bacterial count of the spice used to a safe minimum. However, if the spice is not to be used promptly in an operation involving such heating of the spice, it is desirable to follow the chlorine dioxide treatment, previously discussed, with a comparable heat treatment. The heat treatment alone will not adequately reduce the bacterial count, but where employed in conjunction with a pre-treatment with chlorine dioxide, in accordance with the present invention, a reduction of the bacterial count to within safe limits is attained.

My invention will be further illustrated, and the effectiveness thereof demonstrated, by the following tabulation of results obtained by its application to the sterilizing of black pepper. It will be understood, however, that the utility of the invention is not so restricted, but that the invention is applicable to the sterilization of spices generally.

The results noted in Tables 1 and 2 were obtained by treating substantially dry ground black pepper at room temperature with a mixture of chlorine dioxide and air, the concentration of chlorine dioxide in the mixture being 3880 P. P. M., for the indicated periods. Subsequent to this treatment, the pepper of the samples of Table 1 were incubated at a temperature of 37° C. (98.6° F.) to develop the mezophiles, and the samples of Table 2 were incubated at a temperature of 55° C. (131° F.) to develop the thermophiles. Prior to the incubation, a portion of each sample was heated for 10 minutes at a temperature of 227° F. Each portion was separately incubated and the bacterial count of each was determined in the conventional manner. The sample number, the time of exposure to the chlorine dioxide-air mixture, the bacterial count per gram of pepper, after exposure without the subsequent heating, and the bacterial count per gram of pepper following a subsequent heating, appear in columns 1 to 4, respectively.

Table 1

| Sample No. | Duration of ClO₂ Treatment | Bacterial Count | |
| --- | --- | --- | --- |
| | | Not Heated | Heated |
| 1 | None | 7,125,000/gm | 93,500/gm. |
| 2 | 5 min | 3,875,000/gm | 7,250/gm. |
| 3 | 10 min | 4,525,000/gm | 6,500/gm. |
| 4 | 15 min | 4,000,000/gm | 10,250/gm. |
| 5 | 20 min | 3,250,000/gm | 3,750/gm. |
| 6 | 25 min | 3,000,000/gm | 2,750/gm. |
| 7 | 30 min | 3,250,000/gm | 750/gm. |

Table 2

| Sample No. | Duration of ClO₂ Treatment | Bacterial Count | |
| --- | --- | --- | --- |
| | | Not Heated | Heated |
| 8 | None | 6,500,000/gm | 100,000/gm. |
| 9 | 5 min | 5,750,000/gm | 60,000/gm. |
| 10 | 10 min | 5,500,000/gm | 35,000/gm. |
| 11 | 15 min | 4,750,000/gm | 30,000/gm. |
| 12 | 20 min | 5,000,000/gm | 8,000/gm. |
| 13 | 25 min | 4,750,000/gm | 12,250/gm. |
| 14 | 30 min | 4,250,000/gm | 15,750/gm. |

The results of treatment of samples of moist and dry black pepper, as indicated, are set forth in the following Tables 3 and 4, the samples of Table 3 having been incubated at 37° C. and the samples of Table 4 having been incubated at 55° C. after treatment. Samples 16, 17, 18, 23, 24 and 25 were exposed in a substantially dry condition to a chlorine dioxide-air mixture containing 18,000 P. P. M. of chlorine dioxide for the indicated periods. Samples 19, 20, 21, 26, 27 and 28 were exposed in a moist condition to a chlorine dioxide-air mixture containing 15,400 P. P. M. for the indicated periods.

Table 3

| Sample No. | Duration of ClO₂ Treatment | Bacterial Count | |
| --- | --- | --- | --- |
| | | Not Heated | Heated |
| 15 | None | 32,500,000/gm | 92,500/gm |
| 16 | 1 min | 7,750,000/gm | 2,500/gm |
| 17 | 15 min | 2,200,000/gm | 75/gm |
| 18 | 30 min | 2,225,000/gm | 0/gm |
| 19 | 1 min | 10,750,000/gm | 75/gm |
| 20 | 15 min | 2,975,000/gm | 50/gm |
| 21 | 30 min | 950,000/gm | 0/gm |

Table 4

| Sample No. | Duration of ClO₂ Treatment | Bacterial Count | |
| --- | --- | --- | --- |
| | | Not Heated | Heated |
| 22 | None | 25,000,000/gm | 200,000/gm |
| 23 | 1 min | 7,000,000/gm | 37,500/gm |
| 24 | 15 min | 2,550,000/gm | 3,500/gm |
| 25 | 30 min | 1,325,000/gm | 1,250/gm |
| 26 | 1 min | 11,500,000/gm | 10,000/gm |
| 27 | 15 min | 15,500,000/gm | 1,650/gm |
| 28 | 30 min | 750,000/gm | 1,650/gm |

The results of using still higher concentrations of chlorine dioxide are shown in the following Tables 5 and 6. In Table 5 the pepper after treatment was incubated at 37° C. and that of Table 6 was incubated at 55° C. In the tests set forth in these tables, the concentration of chlorine dioxide was 25,700 P. P. M. and the samples were treated in a substantially dry condition.

Table 5

| Sample No. | Duration of ClO₂ Treatment | Bacterial Count | |
| --- | --- | --- | --- |
| | | Not Heated | Heated |
| 29 | None | 35,000,000/gm | 70,000/gm |
| 30 | 15 min | 2,525,000/gm | 100/gm |
| 31 | 30 min | 3,425,000/gm | 0/gm |

Table 6

| Sample No. | Duration of ClO₂ Treatment | Bacterial Count | |
| --- | --- | --- | --- |
| | | Not Heated | Heated |
| 32 | None | 32,500,000/gm | 200,000/gm |
| 33 | 15 min | 5,225,000/gm | 2,250/gm |
| 34 | 30 min | 4,325,000/gm | 1,500/gm |

From the foregoing tabulation of test results, it appears that the bacterial count is materially reduced by the chlorine dioxide treatment alone, both with respect to mezophiles and thermophiles. It further appears that the bacterial count was substantially reduced by heating alone. For instance, with reference to Table 1 the untreated pepper constituting sample 1 after incubation had a bacterial count of 7,125,000 per gram. By the heat treatment alone this count was reduced to 93,500 per gram. By a 5-minute exposure to the chlorine dioxide atmosphere, without subsequent heating the bacterial count was reduced to about half that of the untreated sample. However, by the combined effect of the pre-treatment with the chlorine dioxide and the subsequent heat treatment, the bacterial count was reduced to only 7250 per gram. Where longer exposure to the chlorine dioxide, or where higher concentrations of the chlorine dioxide was used, the bacterial count was still further reduced, both by chlorine dioxide alone and by the combined chlorine dioxide and heat treatment.

Though I have illustrated the effectiveness of my invention using chlorine dioxide concentrations as high as 25,700 P. P. M., it is usually preferable to employ chlorine dioxide concentrations not exceeding about 20,000 P. P. M. The chlorine dioxide concentrations should not usually be less than about 1000 P. P. M.

I claim:

1. An improved method of reducing the microorganism content of spices without materially bleaching or altering the natural strength or flavor of the spice, characterized by the steps in sequence of treating the spice with a mixture of chlorine dioxide and an inert gas by bringing the two into intimate contact and thereafter heating the spice so treated to a temperature not less than 100° F., but below that at which the spice is deleteriously affected.

2. An improved method of reducing the microorganism content of spices without materially bleaching or altering the natural strength or flavor of the spice, characterized by the steps in sequence of treating the spice with a mixture of chlorine dioxide and air in which the concentration of chlorine dioxide is within the range of 1,000 to 20,000 parts per million by bringing the two into intimate contact and thereafter heating the spice so treated to a temperature not less than 100° F., but below that at which the spice is deleteriously affected.

3. An improved method of reducing the microorganism content of spices without materially bleaching or altering the natural strength or flavor of the spice, characterized by the steps in sequence of treating the spice with a mixture of chlorine dioxide and air in which the concentration of chlorine dioxide is within the range of 1,000 to 20,000 parts per million by bringing the two into intimate contact and thereafter heating the spice so treated to a temperature of about 225° F. for about ten minutes.

ERIC R. WOODWARD.

REFERENCES CITED

The following references are of record in the file of this patent:

UNITED STATES PATENTS

| Number | Name | Date |
| --- | --- | --- |
| 1,274,793 | Sherman | Aug. 6, 1918 |
| 2,002,589 | Sharma | May 28, 1935 |
| 2,018,916 | Krause | Oct. 29, 1935 |
| 2,394,064 | Hutchinson | Feb. 5, 1946 |

FOREIGN PATENTS

| Number | Country | Date |
| --- | --- | --- |
| 116,149 | Australia | Nov. 26, 1942 |